Figure 1:
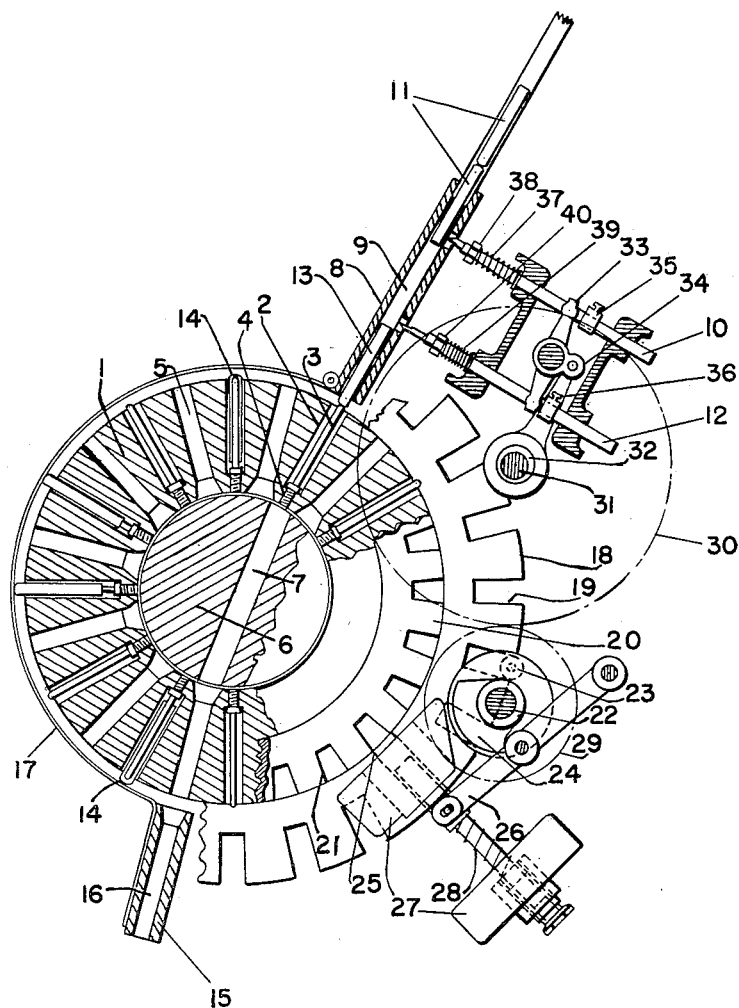

Inventor
IAN FRASER STEWART

Cushman, Darby - Cushman
Attorneys

Patented Mar. 3, 1953

2,630,221

UNITED STATES PATENT OFFICE 2,630,221

APPARATUS PARTICULARLY ADAPTED FOR ORIENTATING HOLLOW ARTICLES OF RELATIVELY GREATER LENGTH THAN WIDTH AND OF SUBSTANTIALLY STRAIGHT LONGITUDINAL AXIS AND HAVING ONE END OPEN AND THE OTHER END AT LEAST SUBSTANTIALLY CLOSED

Ian F. Stewart, Kilwinning, Scotland, assignor to Imperial Chemical Industries Limited, a corporation of Great Britain Application January 10, 1951, Serial No. 205,324
In Great Britain January 24, 1950

11 Claims. (Cl. 209—72)

The present invention is concerned with apparatus particularly adapted for orientating hollow articles of relatively greater length than width and of substantially straight longitudinal axis and having one end open and the other end at least substantially closed.

Such articles can take the form of tubes and articles of other cross sectional form as well as articles the cross section of which varies along their length.

The invention is particularly concerned with apparatus adapted for orientating empty detonator tubes.

The object of the present invention is to provide an apparatus of the kind which permits a continuous succession of said articles to be orientated in such a way that they issue from the apparatus with their closed end downwards more efficiently than heretofore, that is to say an apparatus of the aforesaid kind which, under such conditions that the severity of mechanical handling is reduced to a minimum which is consistent with a close control over the movements of the articles throughout the apparatus, will give the desired orientation with the minimum danger of stoppage due to any irregularity of movement of the said articles.

According to the present invention apparatus particularly adapted for orientating hollow articles of relatively greater length than width and of substantially straight longitudinal axis and having one end open and the other end at least substantially closed comprises in association a rotatable annular drum having an even number of holes spaced substantially equally around its circumference, a stationary guiding member positioned within the said annular drum, an inlet guiding member provided with escapement means, an outlet guiding member, and a shield around the outside of the drum extending at least from the horizontal diameter of the drum to the entry orifice of the outlet guiding member so as to prevent articles in the holes of the drum from falling out before they reach the orifice of the outlet guiding member, wherein in the circumference of said annular drum alternate holes have a fixed axial pin socketed at the inside end of the holes and projecting beyond the periphery of the drum, and the other holes lead without obstruction to the inside of the drum, wherein the said stationary guiding member has a passage so positioned and inclined as to permit an article in a hole which becomes adjacent to the inlet end of said stationary guiding member to enter it and eventually to leave it when another hole becomes adjacent to the outlet end of the stationary guiding member prior to this other hole moving beyond the outlet guiding member, wherein the annular drum is adapted to rotate so that each of its holes in turn passes beneath the inlet guiding member, and wherein the escapement means in said inlet guiding member is adapted to be timed to permit the dropping of an article when each hole having a fixed axial pin passes beneath said inlet guiding member.

If desired the inlet guiding member is positioned radially to the drum before the top dead centre at an angle to the vertical of 360° divided by half the number of said holes.

If desired the outlet guiding member is positioned radially to the drum before the bottom dead centre at an angle to the vertical of 360° divided by the number of said holes.

Particularly for positions given by way of example for said inlet guiding member and said outlet guiding member the stationary guiding member positioned within the said annular drum can be for example a solid stationary core having a passage therethrough so positioned and inclined that its top end meets the inside end of a hole in the annular drum when this hole is in a position before the top dead centre of 360° divided by half the number of holes and its bottom end meets the inside end of a hole in the annular drum when this hole is in a position before the bottom dead centre of 360° divided by the number of holes.

Again on the assumption that the said inlet guiding member and said outlet guiding member are in the positions given by way of example, alternatively and preferably, so as to reduce the maximum distance through which the hollow articles fall in one movement, the said passage through the solid stationary core can be for example so positioned and inclined that its top end meets the inside of a hole in the annular drum when this hole is in a position before the top dead centre of 360° divided by the number of holes and its bottom end meets the inside end of a hole in the annular drum when this hole is in a position before the bottom dead centre of 360° divided by half the number of holes.

Preferably the annular drum is adapted to rotate from the inlet guiding member towards the top dead centre, outlet guiding member, and the bottom dead centre.

Furthermore the escapement means in said inlet guiding member is preferably adapted to be timed to permit the dropping of an article when every hole having a fixed axial pin passes beneath said inlet guiding member.

The said escapement means provided in the inlet guiding member preferably comprises an upper finger and a lower finger. The fingers are preferably adapted to be spring loaded against the articles in the inlet guiding member except when held off by a driving mechanism which is adapted continuously to withdraw and release each finger alternately. Thus the column of articles in the inlet guiding member when the top finger is withdrawn falls on to and is arrested by the bottom finger. The top finger then returns and grips the second article in the column. The bottom finger then retracts and drops the bottom article and returns. The top finger then releases the column, which drops on to the bottom finger, and the cycle continues.

The said drum is preferably continuously indexed round in the direction stated preferably by an external Geneva gear having a number of slots equal to the number of holes in the drum so that each of the holes in turn pauses beneath the said inlet guiding member. The escapement means is geared and timed to the indexing mechanism for rotating the drum so that an article is dropped immediately each pin stops beneath the inlet guiding member. There are thus two drum indexing cycles for each escapement cycle. Should the article approach the drum with its open end lowermost it will drop over the pin and as the drum continues to be indexed round it will be carried round by the pin and consequently turned until the mouth is uppermost, being prevented in the lower positions by the said shield from dropping out of the drum. By the time the article has reached the end of said shield it has been reversed and drops into the discharge orifice of the outlet guiding member. If an article approaches the drum with its closed end first it is dropped as before on to the pin but it remains in the inlet guiding member until the drum indexes again and brings the next hole, one without a pin, into line with the inlet guiding member, when the article drops through the hole and enters the stationary guiding member positioned within said annular drum. Here it is stopped by the inside surface of the drum because at this stage of the cycle of operations the socket end of a hole with a pin is in line with the lower end of the stationary guiding member. One more indexing of the drum, and the next drum hole, one without a pin, stops in line with the lower end of the stationary guiding member, and the article drops through it into the orifice of the outlet guiding member. The drum has in this case passed the article through its stationary guiding member positioned within the annular drum without reversing it.

The apparatus according to the invention can cope with any number of inlet guiding members as it is only necessary to provide the required number of sets of holes spaced along the axis of the drum. Furthermore the required sets of holes can be obtained by two or more drums in association. The stationary guiding members should preferably each be provided with the said escapement means.

It is desirable that the apparatus should be so designed that it can handle without adjustment a chosen range of possible hollow article sizes. In such cases the length of the aforesaid pins is chosen with reference to the maximum length of the hollow articles it is desired to accommodate, that is to say the pins should be of such length that all the hollow articles can hang from them with the bottom of each hollow article against the tip of the pin.

The length of the passage of the stationary guiding member within the annular drum must be long enough to accommodate the longest hollow article and the length of the inlet guiding member below the lower escapement finger must also be long enough to contain it. Furthermore the distance between the upper and lower escapement fingers must be carefully chosen so that, with a column of hollow articles resting on the lower finger the upper finger always grips the hollow article immediately above the bottom one.

Variations in the diameter of the hollow article are less easy to handle. A hollow article of small diameter will be released by the escapement earlier than one of larger diameter and the timing of the apparatus will be affected. If however the apparatus is timed to drop the hollow article of minimum expected diameter at the earliest practicable moment during the dwell of the drum those of maximum diameter will just drop a little later during the dwell and the result will be a slight curtailment in the maximum speed at which the apparatus can be run.

The diameter of the pins is also of importance. If one end of the hollow article is not completely closed then the diameter of the pin must be greater than the diameter of the hole in the end of the hollow article which is only substantially closed. Furthermore if the closed end of the hollow article has a dimple then again the diameter of the pin must be larger than the diameter of the dimple. In fact the pin should preferably be of sufficiently large diameter to permit it having a broad hemispherical tip which will slide smoothly out of the dimple. In this case however the hollow articles must not have a much smaller diameter than the average diameter as articles which are much smaller in diameter will not be acceptable to the rotating drum because they will be too narrow to go over the pin.

A dimple in the base of a hollow article necessitates further modification in the design of the apparatus. When such a hollow article drops open end first over a pin and hangs by its base, the closed end of the hollow article projects a little beyond the end of the pin by virtue of the configuration of the dimple. For such hollow articles it is necessary for the inlet guiding member to be cut short so that the hollow article as it moves past it will clear it. For the same reason the shield has to be placed some distance away from the drum.

The pins project a short distance outside the drum so that a plain ended hollow article dropping base first against a pin can slide downwards when the drum indexes on to the upper surface of the drum without catching the edge of the hole which contains the pin. In accordance with this arrangement the diameter of the hole containing the pin is kept to within twice the diameter of the hollow article of smallest diameter but it must be great enough to ensure that an article cannot be so inclined that its drop may be impeded by its tip coming into contact with the mouth-portion of the hole.

The prevention of stoppages caused by hollow articles being caught between parts in relative motion is achieved by restricting the speed of operation of the apparatus to a safe value so that all types of hollow articles being handled have time to complete their movement during the dwell between indexes of the drum.

An embodiment of the invention is illustrated by way of example with reference to the orientation of empty detonator tubes and to the diagrammatic drawing accompanying the specification whereof the single figure is a side elevation of the apparatus partly sectioned in the plane through one row of radial holes in the drum and includes driving mechanism for indexing the drum and operating the escapement means in the inlet guiding member and also includes detonator tubes within the apparatus.

In the figure, 1 is a rotatable annular drum having ten rows of twenty-four holes equally spaced around its circumference. Half of the holes 2 which are spaced at 30° to each other have a fixed axial pin 3 in a socket 4 at the inside end of these holes. The alternate holes 5 lead without obstruction to the inside of the rotatable drum 1. 6 is a solid stationary core positioned within said annular drum 1 and 7 is a passage within said core 6 so positioned and inclined that its top end is adjacent to the inside end of a hole 5 when this hole is in a position 30° before top dead centre and its bottom end is adjacent to a hole 5 when this hole is in a position 15° before bottom dead centre. 8 is an inlet guiding member and 9 is the passage through it. The inlet guiding member 8 is positioned radially to the annular drum 1 before the top dead centre at an angle of 30° to the vertical. 10 is its upper escapement finger holding back a supply of detonator tubes 11 and 12 is its lower escapement finger which has just dropped a detonator tube 13 with its closed end downwards on to an axial pin 3. 14 are detonator tubes which have previously been dropped on to axial pins 3 with their open ends downwards and are in the process of being reversed. 15 is the outlet guiding member and 16 is the passage through it. The outlet guiding member 15 is positioned radially to the drum 1 before the bottom dead centre at an angle of 15° to the vertical. 17 is the circumferential shield extending from the inlet guiding member 8 to the outlet guiding member 15. The annular drum 1 is arranged to rotate from the inlet guiding member 8 towards the top dead centre, outlet guiding member 15, and bottom dead centre, and so that each of its holes 2 and 5 in turn pauses beneath the inlet guiding member 8.

18 is a Geneva driving plate fixed to one end of the annular drum 1 and has twenty-four driving slots 19 spaced equally around its circumference. 20 is a locking plate fixed to the same end of the drum 1 and has twenty-four equally spaced tapered slots 21 cut around its outside circumference. 22 is a driving shaft carrying the pin 23 which drives the Geneva plate 18 and cam 24, for operating the locking plunger 25 by way of the lock lever 26. 27 are the bearings in which the locking plunger 25 slides and 28 is the return spring of the locking plunger 25. 29 and 30 are the pitch circles of toothed gears of ratio 2 to 1 which operate the eccentric shaft 31 at half the speed of the driving shaft 22. The eccentric shaft 31 carries an eccentric 32 which oscillates the rocker 33 by way of the short crank arm 34. The upper escapement plunger 10 is moved by the rocker 33 when it pushes against the collar 35 on the escapement plunger 10. The lower escapement plunger 12 is moved by the rocker 33 when it pushes against the collar 36 on the escapement plunger 12. The return movement of the escapement plunger 10 is caused by the compression spring 37 acting against a collar 38. The return movement of the plunger 12 is caused by the compression spring 39 acting against a collar 40.

As a column of empty detonator tubes 11 enters the passage 9 of the inlet guiding member 8 it is held by one of the escapement plungers 10 or 12. Since the escapement plungers 10 and 12 are withdrawn and released alternately the plunger 10 will be at some moment released so that it grips the second detonator tube 11 in the column, the lowermost detonator tube 11 having fallen on to the escapement plunger 12. When the escapement plunger 12 withdraws this lowermost tube 11 drops. The annular drum 1 is indexed round with intermittent motion so that each of the twenty-four holes round the circumference of the drum pauses in turn in line with the passage 9 in the inlet guiding member 8. The cycle of operations of the escapement plungers 10 and 12 is controlled so that the plunger 12 is timed to drop the lowermost detonator tube 11 each time a hole 2 containing a pin 3 stops beneath the passage 9 in the inlet guiding member 8.

Should the lowermost tube in the column have its closed end downwards it will, when released by the plunger 12, slide down the passage 9 in the inlet guiding member 8 until the tip of the pin 3 stops its further motion as shown in the drawing. As the drum 1 performs its next indexing movement the detonator tube drops from the tip of the pin 3 on to the surface of the drum 1 along which it slips until the next hole 5 stops beneath the inlet guiding member when this detonator tube falls through the hole 5 into the passage 7 in the stationary core 6 and is stopped there by the socket end 4 of the hole 2 which is adjacent to the lower end of the passage 7 at this stage of the cycle of operations. The next indexing of the drum brings a hole 5 into line with the passage 7. The detonator tube in the passage 7 now drops through this hole 5 and enters the passage 16 in the outlet guiding member 15, having passed through the apparatus without having been reversed.

When the lowermost detonator tube to leave the inlet guiding member 8 is dropped with its open end downwards it falls over a pin 3 leaving the passage 9 of the inlet guiding member completely. As the drum 1 continues to be indexed this detonator tube is carried round towards the outlet guiding member 15 being prevented in the lower positions from dropping off the pin by the shield 17. Several positions of this tube as it is being reversed are shown in the drawing. When the pin stops in line with the passage 16 of the outlet guiding member 15 the tube drops into this passage 16 with the closed end downwards.

The driving pin 23 of the Geneva mechanism is rotated at uniform angular velocity about the centre of the driving shaft 22 which also carries the cam 24. This cam has such a profile and is fixed in such an angular position with respect to the driving pin 23 that it causes withdrawal of the locking plunger 25 only when the driving pin 23 engages with a slot 19 and permits the return spring 28 to return the locking plunger 25 into a slot 21 when the driving pin 23 is leaving a slot 19. The centre of the driving shaft 22 is placed at such an angle with respect to the passage 9 in the inlet guiding member 8 that it brings each of the holes 5 and 2 in the drum 1 alternately to rest exactly in line with the passage 9.

Since the escapement plungers 10 and 12 have to bring about the drop of a detonator tube each time a pin 3 stops beneath the passage 9 the cyclical speed of the escapement has to be exactly half the cyclical speed of the indexing movement of the drum 1. To ensure this the eccentric 32 which drives the escapement plungers 10 and 12 is carried on an eccentric shaft 31 which is geared directly to the driving shaft 22 by a pair of toothed gears 29 and 30, the gear 30 having twice as many teeth as the gear 29.

If desired in accordance with a preferred embodiment of the invention the passage 7 within said solid stationary core 6 is so positioned and inclined that its top end is adjacent to the inside end of the hole 5 when this hole is in a position 15° before top dead centre, and its lower end is adjacent to a hole 5 when this hole is in a position 30° before bottom dead centre. This positioning and inclination of the passage 7 can be made by rotating the solid stationary core 6 as shown in the figure through 180°.

In this preferred embodiment should the lowermost tube in the column have its closed end downwards it will, as in accordance with the previous embodiment, when released by the plunger 12 slide down the passage 9 in the inlet guiding member 8 until the tip of the pin 3 stops its further motion as shown in the drawing. Again, as in the previous embodiment, as the drum 1 performs its next indexing movement the detonator tube drops from the tip of the pin 3 on to the surface of the drum 1 along which it slips until the next hole 5 stops beneath the inlet guiding member when this detonator tube falls through the hole 5. In contradistinction however to the previously described embodiment the detonator tube does not enter the passage 7 in the stationary core 6 but slips along the stationary core 6 until another pin 3 stops beneath the inlet guiding member 8. The detonator tube then enters the passage 7 and as before is stopped there by the socket end 4 of the hole 2 which is adjacent to the lower end of the passage 7 at this stage of the cycle of operation. Again, as before, the next indexing of the drum brings a hole 5 into line with the passage 7 and the detonator tube in the passage 7 drops through this hole 5 but in contradistinction to the previously described embodiment falls on to the shield 17 and only enters the passage 16 of the outlet guiding member 15 after it has been carried round to the passage 16 by the drum 1 which is being indexed.

I claim:

1. Apparatus particularly adapted for orientating hollow articles of relatively greater length than width and of substantially straight longitudinal axis and having one end open and the other end at least substantially closed comprising in association: a rotatable annular drum having an even number of holes spaced substantially equally around its circumference; a stationary guiding member positioned within the said annular drum, an inlet guiding member provided with escapement means; an outlet guiding member; a shield around the outside of said drum extending at least from the horizontal diameter thereof to the entry orifice of said outlet guiding member so as to prevent articles in said drum from falling out before they reach said orifice of said outlet guiding member; a fixed axial pin socketed centrally at the inside end of alternate said drum holes and projecting beyond the periphery of said drum, the others of said holes leading without obstruction to the inside of said drum; and a passage in said stationary guiding member so positioned and inclined as to permit an article in a said unobstructed hole which becomes adjacent to the inlet end of said passage to enter said passage and eventually to leave said passage when another of said unobstructed holes becomes adjacent to the outlet end of said passage prior to the said unobstructed hole moving beyond said outlet guiding member, said annular drum being adapted to rotate so that each of its said holes passes in turn beneath said inlet guiding member, and said escapement means in said inlet guiding member being timed to permit the dropping of an article when each said hole having a fixed axial pin therein passes beneath said inlet guiding member.

2. Apparatus as claimed in claim 1 wherein the inlet guiding member is positioned radially to the drum before the top dead centre at an angle to the vertical of 360° divided by half the number of the drum holes.

3. Apparatus as claimed in claim 1 wherein the outlet guiding member is positioned radially to the drum before the bottom dead centre at an angle to the vertical of 360° divided by the number of the drum holes.

4. Apparatus as claimed in claim 1 wherein the stationary guiding member positioned within the said annular drum is a solid stationary core having a passage therethrough so positioned and inclined that its top end meets the inside end of a drum hole when this hole is in a position before the top dead centre of 360° divided by half the number of the drum holes and the bottom end of said passage meets the inside end of a drum hole when this hole is in a position before the bottom dead centre of 360° divided by the number of the drum holes.

5. Apparatus as claimed in claim 1 wherein the stationary guiding member positioned within the said annular drum is a solid stationary core having a passage therethrough so positioned and inclined that its top end meets the inside of a drum hole when this hole is in a position before the top dead centre of 360° divided by the number of the drum holes and the bottom end of said passage meets the inside end of a drum hole when this hole is in a position before the bottom dead centre of 360° divided by half the number of the drum holes.

6. Apparatus as claimed in claim 1 wherein the annular drum is adapted to rotate from the inlet guiding member towards the top dead centre, outlet guiding member, and the bottom dead centre.

7. Apparatus as claimed in claim 1 wherein said escapement means comprises an upper finger and a lower finger.

8. Apparatus as claimed in claim 1 wherein the escapement means comprises an upper finger and a lower finger, said fingers being spring loaded against the articles in the inlet guiding member, and a driving mechanism for continuously withdrawing and releasing each finger alternately.

9. Apparatus as claimed in claim 1 including an indexing mechanism for continuously indexing the drum around.

10. Apparatus as claimed in claim 1 including an indexing mechanism for continuously indexing the drum around, said mechanism comprising an external Geneva gear having a number of slots equal to the number of holes in the drum so that each of the holes in turn pauses beneath the said inlet guiding member.

11. Apparatus as claimed in claim 1 including an indexing mechanism for continuously indexing the drum around, and wherein the escapement means is geared and timed to said indexing mechanism so that an article will drop immediately as each pin stops beneath the inlet guiding member.

IAN F. STEWART.

REFERENCES CITED

The following references are of record in the file of this patent:

UNITED STATES PATENTS

| Number | Name | Date |
|---|---|---|
| 232,169 | Bennett | Sept. 14, 1880 |
| 233,062 | Barlow | Oct. 12, 1880 |
| 233,095 | Hill | Oct. 12, 1880 |
| 2,394,200 | Nelson | Feb. 4, 1946 |